(12) United States Patent
Catrysse et al.

(10) Patent No.: US 7,417,219 B2
(45) Date of Patent: Aug. 26, 2008

(54) EFFECT OF THE PLASMONIC DISPERSION RELATION ON THE TRANSMISSION PROPERTIES OF SUBWAVELENGTH HOLES

(75) Inventors: Peter B. Catrysse, Palo Alto, CA (US); Hocheol Shin, Stanford, CA (US); Shanhui Fan, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 11/533,719

(22) Filed: Sep. 20, 2006

(65) Prior Publication Data

US 2007/0096087 A1  May 3, 2007

Related U.S. Application Data

(60) Provisional application No. 60/719,249, filed on Sep. 20, 2005.

(51) Int. Cl.
 *H01J 3/14* (2006.01)
 *H01J 5/16* (2006.01)
 *H01J 40/14* (2006.01)

(52) U.S. Cl. .................. 250/234; 385/129; 385/131; 359/360; 359/585; 359/589

(58) Field of Classification Search ................. 250/234; 359/359, 360, 486, 566, 569, 585, 589; 385/14, 385/129, 130, 131, 132, 122, 27, 28
See application file for complete search history.

(56) References Cited

U.S. PATENT DOCUMENTS 5,608,552 A * 3/1997 Smith ............................ 349/5

6,522,469 B1 * 2/2003 Fuqua et al. ................ 359/578

(Continued)

OTHER PUBLICATIONS

Shin et al., "Effect of the Plasmonic Dispersion Relation on the Transmission Properties of Subwavelength Cylindrical Holes", Physical Review B 72, 085436 (Published Aug. 16, 2005).*

(Continued)

*Primary Examiner*—Georgia Y. Epps
*Assistant Examiner*—Francis M Legasse, Jr.
(74) *Attorney, Agent, or Firm*—Davis Wright Tremaine LLP

(57) ABSTRACT

Using a realistic plasmonic model, an optically thick electrically conductive film with subwavelength hole or holes therein is shown to always support propagating modes near the surface plasmon frequency, where cross-sectional dimensions of the hole or holes are less than about $\lambda/2n_h$, $\lambda$ being the wavelength of the light and $n_h$ the refractive index of the dielectric material in the hole or holes. This is the case even when material losses are taken into account. Based on the dispersion analysis, in both a single hole or hole array designs, propagating modes play a dominant role in the transport properties of incident light. These structures exhibit a new region of operation, while featuring a high packing density and diffraction-less behavior. These structures can be used in near-field scanning optical microscopy, in collection and emission modes, for writing data to an optical storage device, as wavelength-selective optical filters, for multispectral imaging of a sample, as photolithography masks for transferring an image to a photoresist-coated substrate, as light emitters, light collectors and light modulators.

27 Claims, 9 Drawing Sheets

U.S. PATENT DOCUMENTS 6,665,014 B1 * 12/2003 Assadi et al. ............... 348/340
2003/0085351 A1 * 5/2003 Nakajima et al. .......... 250/306

OTHER PUBLICATIONS

G.C. Aers, A.D. Boardman and B.V. Paranjape, "Non-radiative surface plasmon-polarition modes of inhomogeneous metal circular cylinders," J. Phys. F: Metal Phys., 10 (1980) UK 1979, pp. 53-65.

W.L. Barnes, W.A. Murray, J. Dintinger, E. Devaux, and T.W. Ebbesen, "Surface Plasmon Polaritons and Their Role in the Enhanced Transmission of Light through Periodic Arrays of Subwavelength Holes in a Metal Film," The American Physical Society, Physical Review Letters, week ending Mar. 12, 2004, vol. 92, No. 10, pp. 107401-1 through 107401-4.

T.W. Ebbesen, H. J. Lezec, H.F. Ghaemi, T. Thio & P.A. Wolff, "Extraordinary optical transmission through sub-wavelength hole arrays," Nature, vol. 391, Feb. 12, 1998, pp. 667-669.

Ph Lalanne, J.P. Hugonin, S. Astilean, M. Palamaru and K.D. Moller, "One-mode model and Airy-like formulae for one-dimensional metallic gratings," J. Opt. A: Pure Appl. Opt.2 (2000) UK, pp. 48-51.

L. Novotny and C. Hafner, "Light propagation in a cylindrical wavelength with a complex, metallic, dielectric function," The American Physical Society, Physical Review E, vol. 50, No. 5, Nov. 1994, pp. 4094-4109.

C. A. Pfeiffer & E. N. Economou, "Surface plaritons in a circularly cylindrical interface: Surface plasmons,"Physical Review B, vol. 10, No. 8, Oct. 15, 1974, pp. 3038-3051.

Hocheol Shin, Peter B. Catrysse, & Shanhui Fan, "Effect of the plasmonic dispersion relation on the transmission properties of subwavelength cylindrical holes," The American Physical Society, Physical Review B 72, Aug. 16, 2005, pp. 085436/1-085436/6.

S. Astilean, Ph. Lalanne, M. Palamaru, "Light transmission through metallic channels much smaller than the wavelength," Optics Communications, Mar. 1, 2000, pp. 265-273.

William L. Barnes, Alain Dereuz & Thomas W. Ebbesen, "Surface plasmon subwavelength optics," Nature, vol. 424, Aug. 14, 2003, pp. 824-830.

Steve Blair & Ajay Nahata, "Focus Issue: Extraordinary Light Transmission Through Sub-Wavelength Structured Surfaces," Optics Express, vol. 12, No. 16, Aug. 9, 2004, 1 pg.

F. J. Garcia de Abajo, "Light transmission through a single cylindrical hole in a metallic film," Optics Express, vol. 10, No. 25, Dec. 16, 2002, pp. 1475-1484.

F. J. Garcia-Vidal & L. Martin-Moreno, "Transmission and focusing of light in one-dimensional periodically nanostructured metals," The American Physical Society, Physical Review B 66, Oct. 17, 2002, pp. 155412-1 through 155412-10.

A. Krishnan, T. Thio, T.J. Kim, H.J. Lezec, T.W. Ebbesen, P.A. Wolff, J. Pendry, L. Martin-Moreno, F.J. Garcia-Vidal, "Evanescently coupled resonance in surface plasmon enhanced transmission," Optics Communications, Dec. 15, 2001, pp. 1-7.

Henri J. Lezec & Tineke Thio, "Diffracted evanescent wave model for enhanced and suppressed optical transmission through subwavelength hole arrays," Optics Express, vol. 12, No. 16, Aug. 9, 2004, pp. 3629-3651.

L. Martin-Moreno, F. J. Garcia-Vidal, H. J. Lezec, K.M. Pellerin, T. Thio, J.B. Pendry & T.W. Ebbesen, "Theory of Extraordinary Optical Transmission through Subwavelength Hole Arrays," The American Physical Society, Physical Review Letters, vol. 86, No. 6, Feb. 5, 2001, pp. 1114-1117.

M. A. Ordal, L. L. Long, R. J. Bell, S.E. Bell, R. R. Bell, R. W. Alexander, Jr., & C.A. Ward, "Optical properties of the metals Al, Co, Cu, Au, Fe, Pb, Ni, Pd, Pt, Ag, Ti, and W in te infrared and far infrared," Applied Optics, vol. 22, No. 7, Apr. 1, 1983, 1099-1119.

J. B. Pendry, L. Martin-Moreno, F. J. Garcia-Vidal, "Mimicking Surface Plasmons with Structured Surfaces," Science, vol. 305, Aug. 6, 2004, pp. 847-848.

E. Popov, M. Neviere, S. Enoch, & R. Reinisch, "Theory of light transmission through subwavelength periodic hole arrays," The American Physical Society, Physical Review B, vol. 62, No. 23, Dec. 15, 2000, pp. 16 100—16 108.

Aleksandar D. Rakic, Aleksandra B. Djurisic, Jovan M. Elazar, & Marian L. Majewski, "Optical properties of metallic films for vertical-cavity optoelectronic devices," Applied Optics, vol. 37, No. 22, Aug. 1, 1998, pp. 5271-5283.

Y. Takakura, "Optical Resonance in a Narrow Slit in a Thick Metallic Screen," The American Physical Society, Physical Review Letters, vol. 86, No. 24, Jun. 11, 2001, pp. 5601-5603.

F. I. Baida & D. Van Labeke. "Three-dimensional structures for enhanced transmission through a metallic film: Annular aperture arrays," The American Physical Society, Physical Review B 67, Apr. 25, 2003, pp. 155314-1 through 155314-7.

Qing Cao & Philippe Lalanne, "Negative Role of Surface Plasmons in the Transmission of Metallic Gratings with Very Narrow Slits," The American Physical Society, Physical Review Letters, vol. 88, No. 5, Feb. 4, 2002, pp. 057403-1 through 057403-4.

D.E. Grupp, H.J. Leze, T.W. Ebbesen, K.M. Pellerin & Tineke Thio, "Crucial role of metal surface in enhanced transmission through subwavelength apertures," American Institute of Physics, Applied Physics Letters, vol. 77, No. 11, Sep. 11, 2000, pp. 1569-1571.

L. Martin-Moreno, F.J. Garcia-Vidal, "Optical transmission through circular hole arrays in optically thick metal films," Optics Express, vol. 12, No. 16, Aug. 9, 2004, pp. 3619-3628.

J. A. Porto, F. J. Garcia-Vidal & J.B. Pendry, "Transmission Resonances on Metallic Gratings with Very Narrow Slits," The American Physical Society, Oct. 4, 1999, vol. 83, No. 14, pp. 2845-2848.

M. A. Ordal, Robert J. Bell, R.W. Alexander, Jr. L.L. Long & M.R. Querry, "Optical properties of fourteen metals in the infrared and far infrared: Al Co, Cu, Au, Fe, Pb, Mo, Ni, Pd, Pt, Ag, Ti, V and W.," Applied Optics, vol. 24, No. 24, Dec. 15, 1985, pp. 4493-4499.

* cited by examiner

HE₁₁

EH₁₁

TE₁₁

TM₁₁

EFFECT OF THE PLASMONIC DISPERSION RELATION ON THE TRANSMISSION PROPERTIES OF SUBWAVELENGTH HOLES

CROSS REFERENCE TO RELATED APPLICATION

This application claims the benefit of U.S. Provisional Application No. 60/719,249, filed Sep. 20, 2005, entitled "Effect of the Plasmonic Dispersion Relation on the Transmission Properties of Subwavelength Cylindrical Holes," which application is incorporated in its entirety by reference as if fully set forth herein.

This work was supported in part by National Science Foundation Grant No. ECS-0134607 and by AFOSR Grant No. FA9550-04-1-0437. The U.S. Government has rights in the invention in this application.

BACKGROUND OF THE INVENTION

The optical properties of nanoapertures in an optically thick metallic film have been intensely researched in the past several years due to their fundamental importance in near-field optics, and their practical significance to photonic devices and applications, including filters, near-field probes, and optical data storage. For the latest developments, see for example the focus issue in Optics Express 12, 3618 (2004). It is well-known that the transmission characteristics are strongly influenced by the presence or absence of propagating modes inside the apertures. J. A. Porto, F. J. Garcia-Vidal, and J. B. Pendry, Physical Review Letters 83, 2845 (1999); F. I. Baida and D. Van Labeke, Physical Review B 67 (2003). In metallic nanoslits, enhanced transmission has been attributed to propagating transverse magnetic (TM) modes inside the slits. J. A. Porto, F. J. Garcia-Vidal, and J. B. Pendry, Physical Review Letters 83, 2845 (1999); Y. Takakura, Physical Review Letters 86, 5601 (2001); E. Popov, M. Neviere, S. Enoch, and R. Reinisch, Physical Review B 62, 16100 (2000); S. Astilean, P. Lalanne, and M. Palamaru, Optics Communications 175, 265 (2000); P. Lalanne, J. P. Hogonin, S. Astilean, M. Palamarn, and K. D. Moller, Journal of Optics A: Pure Applied Optics 2, 48 (2000); Q. Cao and P. Lalanne, Physical Review Letters 88 (2002). For cylindrical holes, such as those featured in Ebbesen et al.'s original experiments, T. W. Ebbesen, H. J. Lezec, H. F. Ghaemi, T. Thio, and P. A. Wolff, Nature 391, 667 (1998), the spectral features have been shown to be largely independent of the material used for the vertical walls of the hole. D. E. Grupp, H. J. Lezec, T. W. Ebbesen, K. M. Pellerin, and T. Thio, Applied Physics Letters 77, 1569 (2000); L. Martin-Moreno, F. J. Garcia-Vidal, H. J. Lezec, K. M. Pellerin, T. Thio, J. B. Pendry, and T. W. Ebbesen, Physical Review Letters 86, 1114 (2001). Therefore, the prevailing wisdom is that cylindrical holes do not support propagating modes when the hole diameter is smaller than $\approx \lambda/2n_h$, where $\lambda$ is the wavelength of incident light and $n_h$ is the refractive index of the material inside the hole. W. L. Barnes, W. A. Murray, J. Dintinger, E. Devaux, and T. W. Ebbesen, Physical Review Letters 92, 107401 (2004); W. L. Barnes, A. Dereux, and T. W. Ebbesen, Nature 424, 824 (2003). Instead, enhanced transmission is commonly associated with an excitation of surface wave resonances on the front and back surfaces of the metallic film, and an evanescent tunneling process through the holes between these resonances. T. W. Ebbesen, H. J. Lezec, H. F. Ghaemi, T. Thio, and P. A. Wolff, Nature 391, 667 (1998); L. Martin-Moreno, F. J. Garcia-Vidal, H. J. Lezec, K. M. Pellerin, T. Thio, J. B. Pendry, and T. W. Ebbesen, Physical Review Letters 86, 1114 (2001); W. L. Barnes, A. Dereux, and T. W. Ebbesen, Nature 424, 824 (2003); A. Krishnan, T. Thio, T. J. Kima, H. J. Lezec, T. W. Ebbesen, P. A. Wolff, J. Pendry, L. Martin-Moreno, and F. J. Garcia-Vidal, Optics Communications 200, 1 (2001); J. B. Pendry, L. Martin-Moreno, and F. J. Garcia-Vidal, Science 305, 847 (2004); H. J. Lezec and T. Thio, Optics Express 12, 3629 (2004).

SUMMARY OF THE INVENTION

In one embodiment of the invention, a layer of electrically conductive material has at least one hole therein. The layer interacts with light of at least one wavelength $\lambda$ and the material of the layer is opaque to the light the layer is interacting with. A dielectric material is in the at least one hole and has refractive index $n_h$. A cross-sectional dimension of the at least one hole is less than about $\lambda/2n_h$, wherein when said body is illuminated by the light, a propagating mode of the light is present in the at least one hole so that the body transmits the light.

In another embodiment, a layer of electrically conductive material having at least one hole therein is provided, where said material is opaque to light of at least one wavelength $\lambda$ and has plasma wavelength $\lambda_p$. A dielectric material is caused to be present in the at least one hole, said dielectric material having a dielectric constant $\in_h$. The electrically conductive and dielectric materials are chosen so that $\lambda$ is about equal to $\lambda_p(1+\in_h)^{1/2}$.

In yet another embodiment, a near-field scanning optical microscope probe for use in detecting a sample in collection mode is provided using light of at least one wavelength $\lambda$ from a light source. The probe includes a layer of electrically conductive material having one hole therein, said material being opaque to the light; and a dielectric material in the one hole having refractive index $n_h$, said material being different from air, wherein a cross-sectional dimension of the hole is less than about $\lambda/2n_h$, wherein when said layer is illuminated by the light, a propagating mode of the light is present in the hole so that the layer transmits the light. An optical conduit transmits the light to said layer through a sample so that the sample can be examined in collection mode.

In one more embodiment, a near-field scanning optical microscope probe for use in detecting a sample in emission mode employs a layer of electrically conductive material having one hole therein and light of at least one wavelength $\lambda$ from a light source. The material is opaque to the light. A dielectric material is provided in the one hole having refractive index $n_h$, said material being different from air, wherein a cross-sectional dimension of the hole is less than about $\lambda/2n_h$. When said layer is illuminated by the light, a propagating mode of the light is present in the hole so that the layer transmits the light. An optical conduit transmits the light to said layer through said sample. A photodetector detects light passing through said hole and through the sample where the optical microscope operates in emission mode.

In still one more embodiment, an optical apparatus for writing data to an optical storage device uses light of at least one wavelength $\lambda$ from a light source. The device has a surface with a plurality of light sensitive areas thereon. The apparatus comprises a layer of electrically conductive material having one hole therein placed adjacent to said device, said material being opaque to the light; and a dielectric material in the hole having refractive index $n_h$. The dielectric material is different from air, wherein a cross-sectional dimension of the hole is less than about $\lambda/2n_h$, wherein when said layer is illuminated by the light, a propagating mode of the light is present in the hole so that the layer transmits the light from the light source to each of a plurality of selected pixels of the device. An instrument causes relative motion between the device and the layer so that data is written to different surface areas of the device.

Another embodiment provides a wavelength-selective optical filter having a pass band that includes light of at least one wavelength $\lambda$. The filter comprises a layer of electrically conductive material having a plurality of holes therein, said material being opaque to the light; and a dielectric material in the holes having refractive index $n_h$, said material being different from air. Cross-sectional dimensions of the holes are less than about $\lambda/2n_h$, wherein when said layer is illuminated by the light, a propagating mode of the light is present in the holes so that the layer transmits the light of wavelength $\lambda$ and blocks light outside the pass band where the propagating mode is absent in the holes.

One more embodiment is directed an apparatus for multispectral imaging of a sample by means of light of at least a number of wavelengths $\lambda_i$, i ranging from 1 to m, m being a positive integer. The apparatus comprises a layer of electrically conductive material having a plurality of arrays of holes therein, said material being opaque to the light of wavelengths $\lambda_i$; and a dielectric material in the holes having refractive index $n_h$, said material being different from air. The cross-sectional dimensions of the holes are less than about $\lambda_i/2n_h$, wherein when said layer is illuminated by the light, a propagating mode of the light is present in the holes so that the layer transmits the light of wavelength $\lambda_i$. A photodetector has a surface with a plurality of light sensitive pixels thereon, wherein each array of holes is adjacent to a corresponding pixel of the photodetector so that light originating from the sample and passing through such array reaches its corresponding pixel, causing the photodetector to collect at such pixel a signal representative of the power in the sample at one of the wavelengths $\lambda_i$.

According to another embodiment, a photolithography mask for transferring an image to a photoresist-coated substrate uses light of at least one wavelength $\lambda$ from a light source. The mask comprises a layer of electrically conductive material having a plurality of holes therein, said material being opaque to the light, said holes forming a pattern corresponding to the image to be transferred; and a dielectric material in the holes having refractive index $n_h$, said material being different from air. Cross-sectional dimensions of the holes are less than about $\lambda/2n_h$, wherein when said layer is illuminated by the light, a propagating mode of the light is present in the holes so that the layer transmits the light to the photoresist-coated substrate according to the pattern of holes in the layer.

According to one embodiment, a light emitter of light of at least one wavelength $\lambda$ comprises a device that emits the light in response to electrical signals; and a layer of electrically conductive material having a plurality of holes therein, said material being opaque to the light, said layer being in electrical contact with said device. The emitter also includes a dielectric material in the holes having refractive index $n_h$, said material being different from air, wherein cross-sectional dimensions of the holes are less than about $\lambda/2n_h$. When said layer is illuminated by the light, a propagating mode of the light is present in the holes so that when the electrical signals are applied to the layer, the signals are transmitted to the device, causing the device to emit the light that passes through the holes in the layer.

In another embodiment, a light collector of light of at least one wavelength $\lambda$, comprises a device that generates electrical current in response to the light; and a layer of electrically conductive material having a plurality of holes therein, said material being opaque to the light, said layer being in electrical contact with said device. The collector also includes a dielectric material in the holes having refractive index $n_h$, said material being different from air. Cross-sectional dimensions of the holes are less than about $\lambda/2n_h$, wherein when said layer is illuminated by the light, a propagating mode of the light is present in the holes so that when the light is applied to the layer, the light reaches the device through the holes in the layer, causing the device to generate the electrical current.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

FIG. 1(a) illustrates the dispersion relations of the two lowest-order waveguide modes with angular momentum m=1 for a plasmonic model. The solid line corresponds to the dispersion of the $HE_{11}$ mode, while the dashed line shows the dispersion of the $EH_{11}$ mode.

FIG. 1(b) illustrates the dispersion relations of the two lowest-order waveguide modes with angular momentum m=1 assuming a perfect electric conductor (PEC) model. The featured modes are $TE_{11}$ (solid line) and $TM_{11}$ (dashed line).

FIG. 3(b) shows the detailed transmission spectrum from $\lambda$=100 nm to $\lambda$=300 nm of the same structure whose spectrum is shown in FIG. 3(a).

Identical components in this application are labeled by the same numerals.

DETAILED DESCRIPTION OF EMBODIMENTS

Figure 1A:
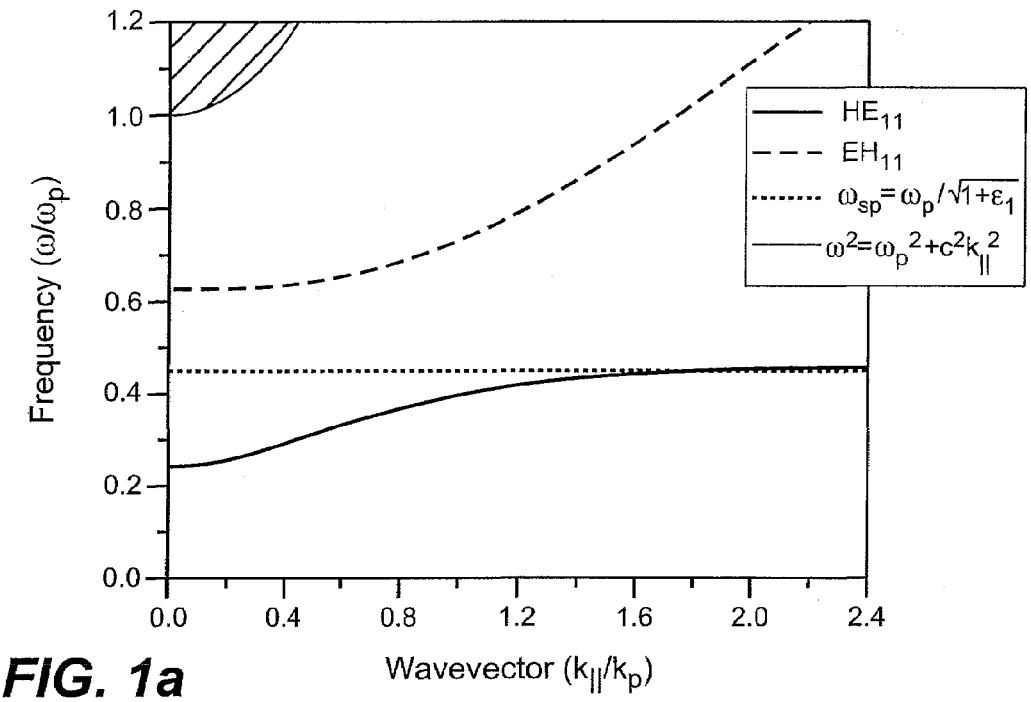
FIGS. 1(a) and 1(b) are dispersion diagrams for a cylindrical hole with radius $0.36\lambda_p$, where $\lambda_p$ is the plasma wavelength.

In some embodiments of the invention in this application, we investigate the effect of the dispersion relation on the transmission properties of subwavelength cylindrical holes in an optically thick metallic film. We describe the optical properties of the metal using a Drude free-electron model:

$$\varepsilon_s(\omega) = 1 - \frac{\omega_p^2}{\omega(\omega - i\omega_\tau)}, \quad (1)$$

where $\omega_p$ is the plasma frequency and $\omega_\tau$ is the collision frequency both expressed in rad/s. While In this model, the dielectric function takes into account the contribution of free electrons only and displays plasma-like dispersion. Hence, we refer to it as a plasmonic model. Despite its apparent simplicity, the plasmonic model has been the source of valuable insights into the behavior of real metals. For aluminum and most alkali metals, its regime of validity extends deep into the visible wavelength regime. C. F. Bohren and D. R. Huffman, Absorption and scattering of light by small particles (Wiley, New York, 1983). In describing the optical behavior of noble metals (e.g., silver, gold, copper), it has proven to be accurate in the near and far infrared wavelength regime, M. A. Ordal, R. J. Bell, R. W. Alexander, Jr., L. L. Long, and M. R. Querry, Applied Optics 24, 4493 (1985); M. A. Ordal, L. L. Long, R. J. Bell, S. E. Bell, R. R. Bell, R. W. Alexander, Jr., and C. A. Ward, Applied Optics 22, 1099 (1983), while being a reasonable approximation in the visible wavelength range above 500 nm. By allowing for additional Lorentzian resonance terms, its use can be easily extended to the entire visible wavelength range, i.e., below 500 nm, where interband transitions often contribute to the dielectric function. A. D. Rakic, A. B. Djurisic, J. M. Elazar, and M. L. Majewski, Applied Optics 37, 5271 (1998); L. Novotny and C. Hafner, Physical Review E (Statistical Physics, Plasmas, Fluids, and Related Interdisciplinary Topics) 50, 4094 (1994). Here, we study the optical behavior of subwavelength cylindrical holes in an optically thick metallic film when the metal is described using the plasmonic model. We compare and contrast it to the optical behavior predicted by the often-used perfect electric conductor (PEC) model. J. A. Porto, F. J. Garcia-Vidal, and J. B. Pendry, Physical Review Letters 83, 2845 (1999); Y. Takakura, Physical Review Letters 86, 5601 (2001); F. de Abajo, Optics Express 10, 1475 (2002); F. J. Garcia-Vidal and L. Martin-Moreno, Physical Review B 66, 155412 (2002). For a cylindrical waveguide, it has been shown that the dispersion relation is qualitatively different for a plasmonic model as opposed to a PEC model. L. Novotny and C. Hafner, Physical Review E (Statistical Physics, Plasmas, Fluids, and Related Interdisciplinary Topics) 50, 4094 (1994). To the best of our knowledge, however, the importance of a plasmonic dispersion relation for the transport of incident light through subwavelength cylindrical holes has never been recognized.

We find that the plasmonic dispersion diagram exhibits three distinct features that have a profound impact on the transmission of incident light through cylindrical holes. First, such holes always support propagating modes near the surface plasmon frequency, regardless of how small the holes are. Even when material losses are included as part of the plasmonic model, the modes still propagate over several microns when the radius of the holes is smaller than $\lambda/2n_h$, or even much smaller than $\lambda/2n_h$. Second, the fundamental (lowest frequency) mode has an $HE_{11}$ signature, which enables it to couple to a normally incident plane wave. The $HE_{11}$ mode is located completely below the surface plasmon frequency of the metal. Thus, a cylindrical hole in a plasmonic metal always exhibits a passband below the surface plasmon frequency. Third, when the radius of the hole is small, there exists a stopband for a normally incident plane wave, where the light does not transmit. The location of this band is just above the surface plasmon frequency. Hence, a single hole or a hole array may behave as a bandpass filter and allow longer wavelengths to pass through while rejecting shorter ones. All of these features are fundamentally different from the behavior of the PEC model. Furthermore, they cannot be explained by a PEC model, even when such a model uses an effective hole radius, which is derived from a skin depth calculation.

Based on the dispersion analysis, we use three-dimensional (3D) finite-difference time-domain (FDTD) simulations to investigate the transmission of both single holes and hole array structures in which propagating modes play a dominant role in the transport properties of incident light. These structures feature a high packing density, diffractionless behavior, and they exhibit a new region of operation that has not been probed yet experimentally.

II. Analysis of Propagating Modes

Figure 5:
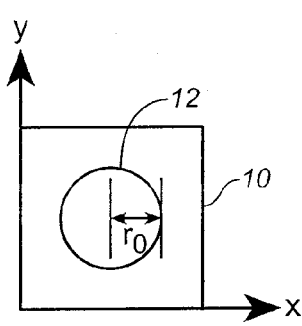
FIG. 5 is a top view of an electrically conductive layer 10 with a cylindrical hole with radius $r_0$ to illustrate one embodiment of the invention.

To calculate the propagating modes inside a cylindrical hole, we consider a z-invariant waveguide with a cylindrical cross-section of radius $r_0$ in the transverse xy-plane as shown in a schematic view of FIG. 5. For the dielectric inside the hole, we use a real, frequency-independent dielectric function $\in_h$.

For the surrounding metal, we define a frequency-dependent dielectric function $\in_s$. The mode (m,n) of the waveguide is found by solving Maxwell's equations in cylindrical coordinates for electric and magnetic fields of the form $\psi(r,\phi,z,t) = \psi_n(r)\exp(jm\phi)\exp[j(\omega t - k_\| z)]$, where m is an integer denoting angular momentum, n is related to the number of nodes in the radial direction, while $\omega$ and $k_\|$ are the frequency and the wavevector of a mode in the hole. By matching boundary conditions, a transcendental equation is obtained as dispersion relation, C. A. Pfeiffer, E. N. Economou, and K. L. Ngai, Physical Review B (Solid State) 10, 3038 (1974).

$$\left[\frac{\varepsilon_h}{k_{T,h}}\frac{J'_m}{J_m} - \frac{\varepsilon_s}{k_{T,s}}\frac{H_m^{(1)\prime}}{H_m^{(1)}}\right]\left[\frac{1}{k_{T,h}}\frac{J'_m}{J_m} - \frac{1}{k_{T,s}}\frac{H_m^{(1)\prime}}{H_m^{(1)}}\right] = m^2\frac{c^2 k_\parallel^2}{\omega^2 r_0^2}\left(\frac{1}{k_{T,h}^2} - \frac{1}{k_{T,s}^2}\right)^2, \quad (2)$$

where $J_m(k_{T,h}r)$ and $H_m^{(1)}(k_{T,s}r)$ represent m-th order Bessel and Hankel functions of the first kind, and $$k_{T,h} = \sqrt{\left(\frac{\omega}{c}\right)^2 \varepsilon_h - k_\parallel^2}, \quad k_{T,s} = \sqrt{\left(\frac{\omega}{c}\right)^2 \varepsilon_s - k_\parallel^2}. \quad (3)$$

The prime above these functions denotes differentiation with respect to their argument. The speed of light in vacuum is denoted by c. The dispersion equation Eq. (2) differs qualitatively from that of a cylindrical PEC waveguide with radius $r_0$, for which we readily obtain $J'_m(k_{T,h}r_0)=0$ for transverse electric (TE) and $J_m(k_{T,h}r_0)=0$ for TM modes. D. M. Pozar, Microwave engineering (John Wiley & Sons, New York, 1997). The propagating modes inside the cylindrical hole are calculated by solving for the roots of the dispersion equation, i.e., we numerically determine the $(\omega,k_\parallel)$ pairs that satisfy Eq. (2). The procedure involves a first coarse scanning of the $(\omega,k_\parallel)$ space to determine the approximate location of the dispersion relation. The solution is then refined to machine-precision near the approximate location using Newton's method. Mathematica, (Wolfram Research, Inc., Champaign, Ill., 2004).

In what follows, we assume that $\varepsilon_s(\omega)$ takes on the form of Eq. (1) with the collision frequency $\omega_\tau$ set to zero. This amounts to the lossless plasmonic model. In addition, we set $\varepsilon_h=4$ (e.g., $Si_3N_4$) for a reason that will become apparent when we discuss the transmission calculations. Here, it suffices to point out that the cutoff for each mode in the dispersion diagram scales inversely proportional with $\sqrt{\varepsilon_h}$, while the surface plasmon frequency varies inversely proportional with $\sqrt{1+\varepsilon_h}$. Hence, from the results shown below one can easily infer the general behavior for any value of $\varepsilon_1$ for both the PEC and the plasmonic case.

For a hole radius $r_0=0.36\lambda_p$, where $$\lambda_p = \frac{2\pi c}{\omega_p}$$

is the plasma wavelength, the resulting dispersion relations are shown in FIG. 1. For the plasmonic model (FIG. 1a), we distinguish two types of modes: bulk modes, which extend into the metal region and lie above the line defined by $\omega^2=\omega_p^2+c^2k_\parallel^2$; and propagating waveguide modes, which are confined to the dielectric region of the waveguide. The latter exhibit two discrete bands labeled $HE_{11}$ and $EH_{11}$, since we only consider modes with angular momentum m=1 so that they can couple to a normally incident plane wave. Unlike a PEC waveguide, the modes of a plasmonic waveguide are not purely TM or TE unless the angular momentum m=0. When m≠0, we designate the modes as $HE_{mn}$ ($EH_{mn}$) when the $H_z(E_z)$ component is dominant.

The fundamental $HE_{11}$ mode lies completely below the surface plasmon frequency of the metal-dielectric interface. The vector plot of the electric field provides evidence that this mode has the correct symmetry to couple a normally incident plane wave. At $k_\parallel=0$, the cutoff frequency of the $HE_{11}$ mode varies as a function of the hole radius. For the parameters used here, the normalized cutoff frequency is $\omega_c^{HE_{11}}=0.24\omega_p$ ($\lambda_c^{HE_{11}}=4.17\lambda_p$) for $\varepsilon_h=4$. When $k_\parallel\to\infty$, the frequency of the $HE_{11}$ mode approaches the surface plasmon frequency $\omega_{sp}=\omega_p/\sqrt{\varepsilon_h+1}$.

The next higher-order mode with m=1, which also couples to a normally incident plane wave (see vector plot of the electric field), is the $EH_{11}$ mode. The band of this mode lies completely above the surface plasmon frequency. At $k_\parallel=0$, the cutoff frequency of the $EH_{11}$, mode is $\omega_c^{EH_{11}}=0.63\omega_p$ ($\lambda_c^{EH_{11}}=1.59\lambda_p$) for $\varepsilon_h=4$. When $k_\parallel\to\infty$, the frequency of the $EH_{11}$ mode approaches the light line in the dielectric. The dispersion diagram shows clearly that the $HE_{11}$ and $EH_{11}$ mode are separated by a stopband, which is located between the surface plasmon frequency and $EH_{11}$ mode cutoff frequency. Within the stopband, there are modes ($TM_{01}$ and $HE_{21}$), but they do not couple to a normally incident plane wave.

Figure 1B:
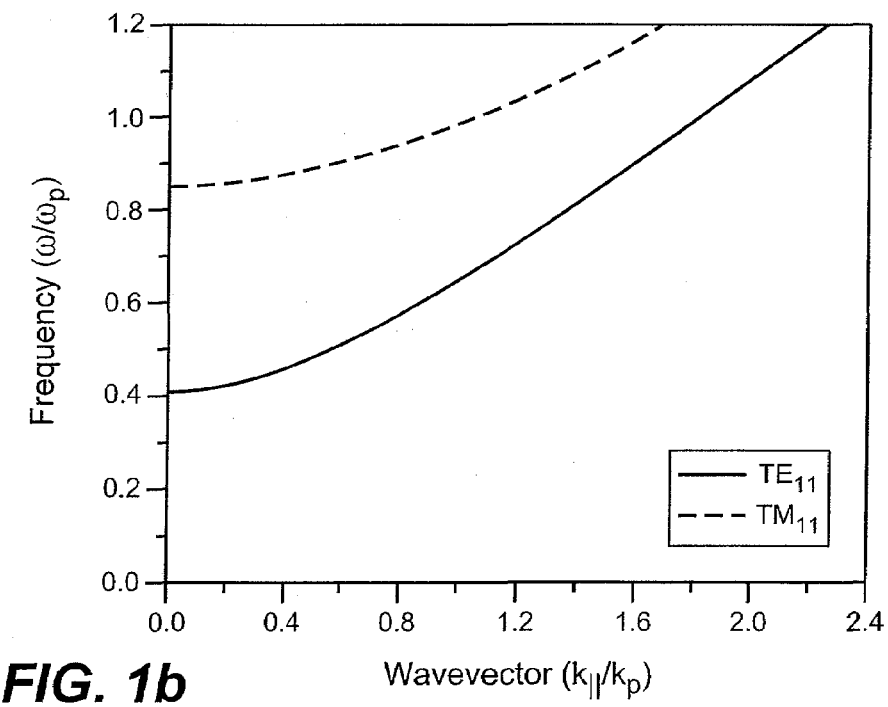
Figure 1C:
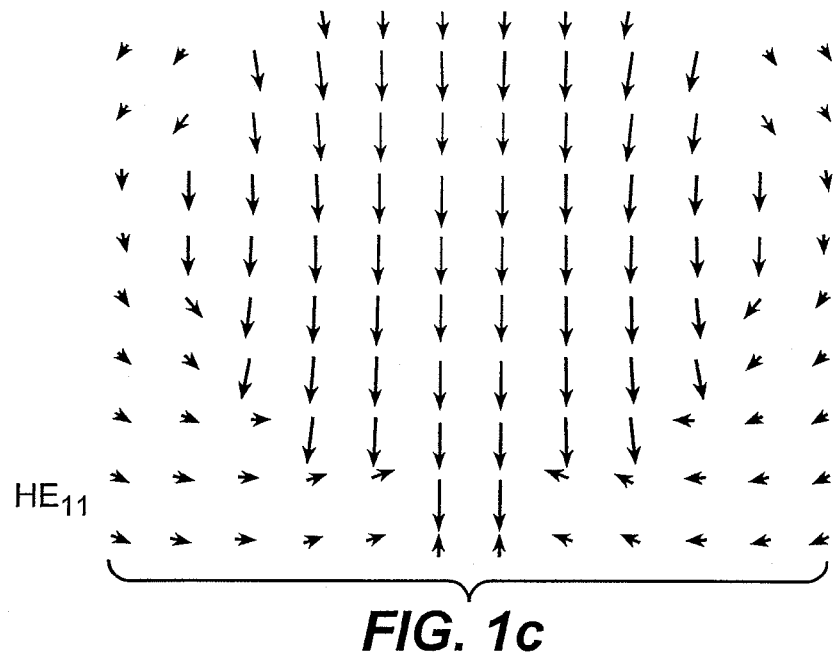
FIGS. 1(c) and 1(d) show the vector plots for the electric fields of the $HE_{11}$ and the $EH_{11}$ mode of FIG. 1(a), respectively.
Figure 1D:
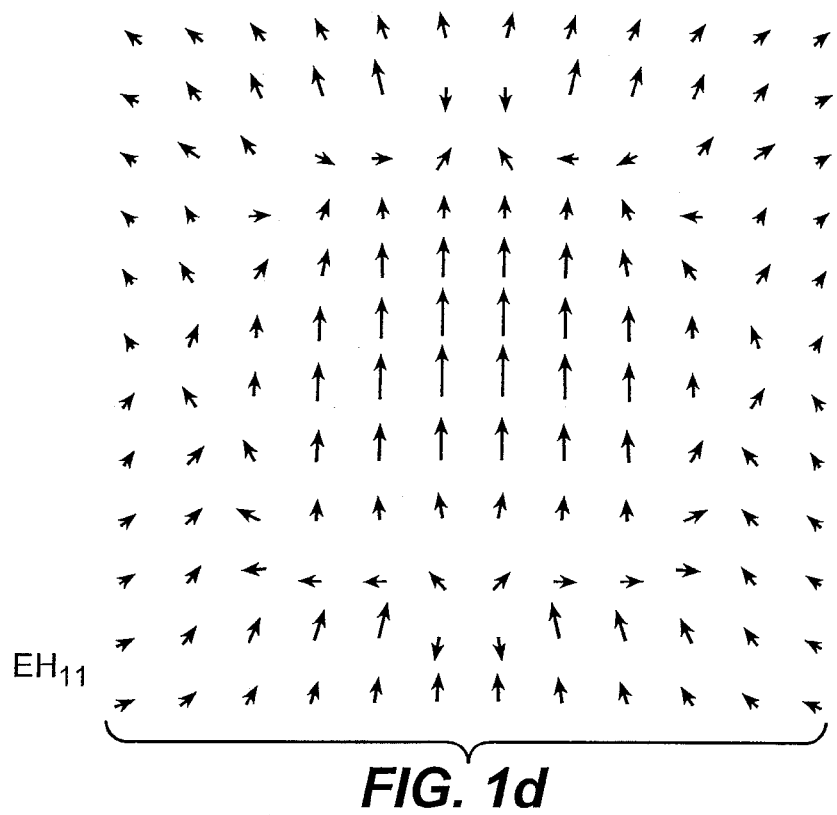
Figure 1E:
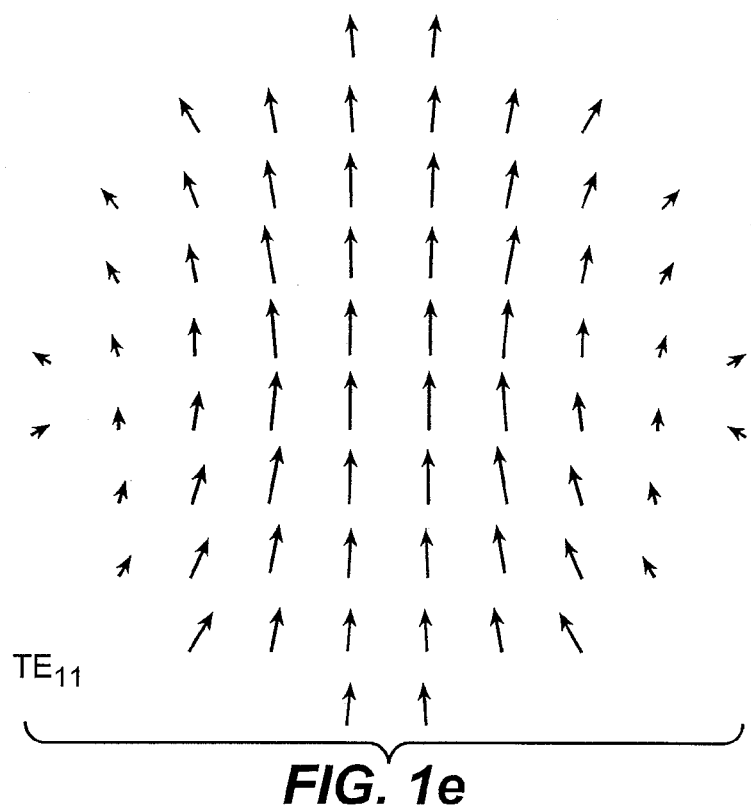
FIGS. 1(e) and 1(f) show the vector plots for the electric fields of the $TE_{11}$ and the $TM_{11}$ mode, respectively.
Figure 1F:
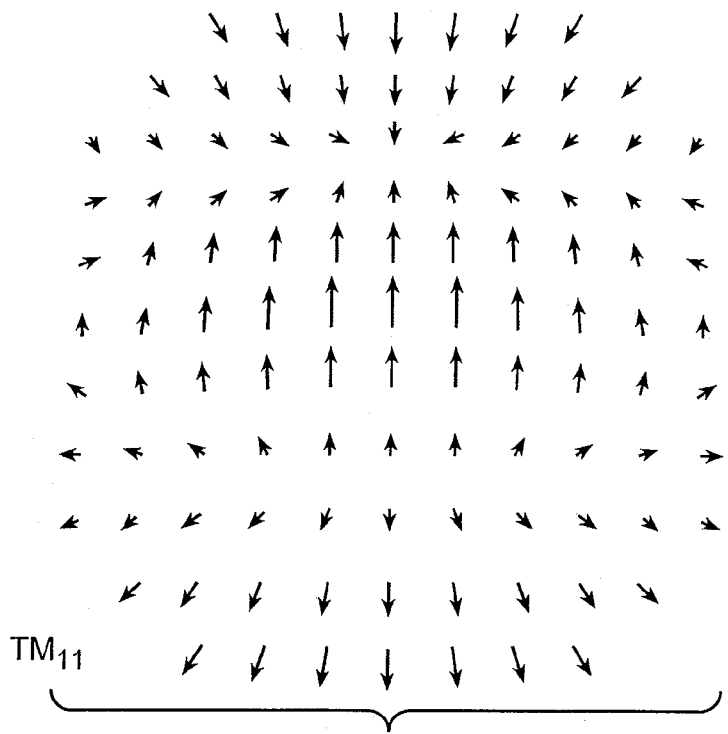

FIG. 1b shows the dispersion relations for the cylindrical PEC waveguide. For comparison purposes, we show only the fundamental $TE_{11}$ mode and the $TM_{11}$ mode. As can be inferred from the vector plots of their respective electric fields, these modes are the two lowest order modes that couple to a normally incident plane wave. The $TE_{11}$ mode cuts off at $\omega_c^{TE_{11}}=0.41\omega_p$ ($\lambda_c^{TE_{11}}=2.44\lambda_p$) for $k_\parallel=0$. Below this cutoff frequency, no propagating modes exist for a cylindrical PEC waveguide. D. M. Pozar, Microwave engineering (John Wiley & Sons, New York, 1997). For $k_\parallel\to\infty$, the frequency behavior of the $TE_{11}$ mode approaches that of the light line. Similarly, for the $TM_{11}$ mode, the cutoff frequency at $k_\parallel=0$ is $\omega_c^{TM_{11}}=0.85\omega_p$ ($\lambda_c^{TM_{11}}=1.18\lambda_p$) and for $k_\parallel\to\infty$, the dispersion relation asymptotically approaches the light line.

Figure 2A:
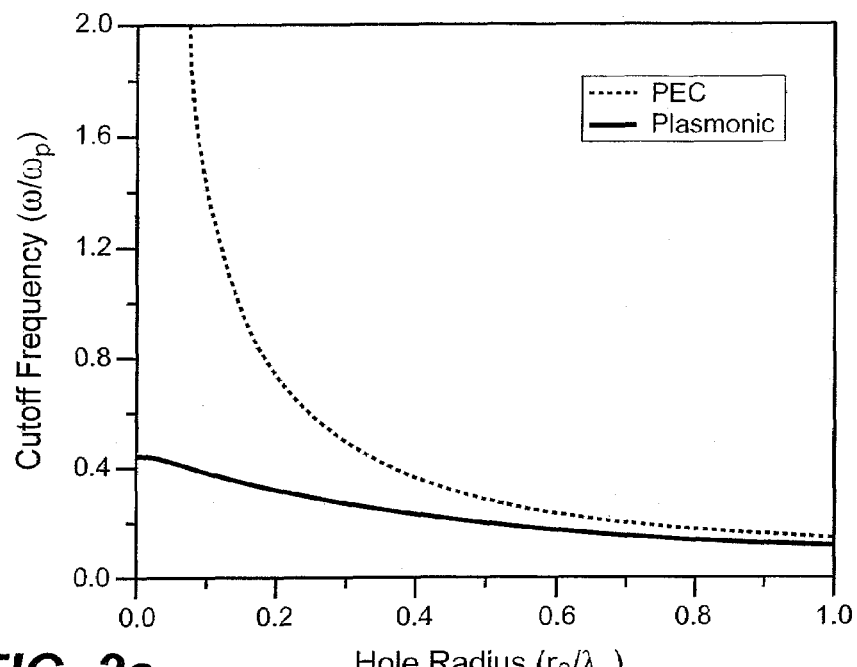
FIGS. 2(a) and 2(b) illustrate the cutoff frequency and cutoff wavelength of the lowest-order waveguide mode versus hole radius $r_0$ for the PEC ($TE_{11}$, dashed lines) and the plasmonic ($HE_{11}$, solid lines) model, respectively.
Figure 2B:
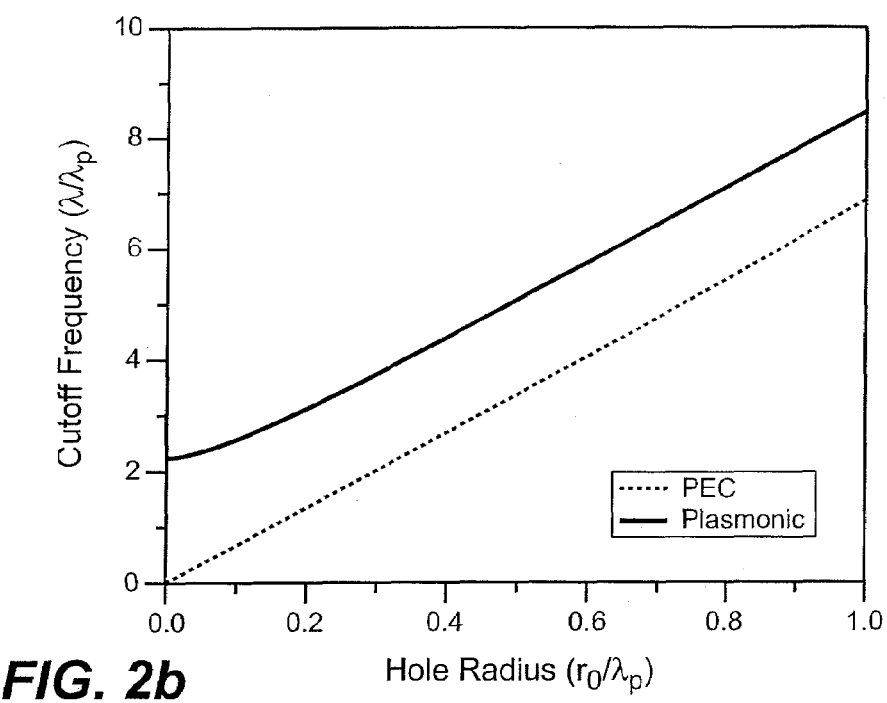

The dispersion diagram of the plasmonic waveguide is quite distinct and qualitatively different from the PEC one. For example, the stopband between the two lowest order propagating modes in the plasmonic waveguide is absent in the PEC model. The modes themselves also have distinct dispersion properties. The cutoff wavelength of the $HE_{11}$ mode in the plasmonic waveguide is almost twice as long as the cutoff wavelength of the $TE_{11}$ mode in the PEC waveguide. Hence, the plasmonic waveguide can sustain a propagating mode at a significantly longer cutoff wavelength than is to be expected from a PEC waveguide model. The qualitative difference in dispersion becomes particularly prominent for smaller holes. FIGS. 2a and 2b describe the evolution of the cutoff frequency (main panel) and wavelength (inset) for the fundamental mode as a function of hole radius for the PEC (dashed lines) and the plasmonic (solid lines) waveguide, respectively. For the PEC waveguide, the cutoff wavelength is proportional to the hole radius $r_0$ and remains so as the radius goes to zero. For the plasmonic waveguide, on the other hand, two different regimes of operation can be identified. In the "large" hole regime, the behavior is quite similar to the PEC waveguide and differs only by a "fixed" offset in wavelength, which is approximately equal to $\lambda_p$. In the "small" hole region, however, the behavior of the plasmonic waveguide deviates significantly from the PEC result and the cutoff wavelength tends towards the surface plasmon wavelength inside the hole ($\sqrt{1+\varepsilon_h}\lambda_p$) when the hole radius goes to zero. This suggests that cylindrical holes in a plasmonic material can support propagating modes, regardless of how small the holes are. (Note that for holes that are sufficiently small, one needs to take into account the non-local nature or spatial dispersion of the complex dielectric function $\varepsilon_s(\omega,k)$, i.e., the plasmonic model is no longer valid.

G. C. Aers, A. D. Boardman, and B. V. Paranjape, Journal of Physics F (Metal Physics) 10, 53 (1980). However, for holes larger than 100 nm, we still expect the local dielectric function to be valid. L. Novotny and C. Hafner, Physical Review E (Statistical Physics, Plasmas, Fluids, and Related Interdisciplinary Topics) 50, 4094 (1994)).

In addition to the difference regarding the presence/absence of a stopband, the cutoff behavior of the plasmonic waveguide cannot be explained by naively enlarging the PEC hole by a value proportional to the skin depth. L. Martin-Moreno and F. J. Garcia-Vidal, Optics Express 12, 3619 (2004). We have calculated the skin depth from the field profile of the $HE_{11}$ mode at cutoff for varying hole radius (see inset). Here, we define skin depth $\delta_s$ as the distance inside the metal where the field magnitude drops to 1/e times its value at the dielectric-metal interface, $$\frac{H_z(r=r_0+\delta_s)}{H_z(r=r_0)} = \frac{H_1^{(1)}(k_T(r_0+\delta_s))}{H_1^{(1)}(k_T r_0)} = \frac{1}{e}. \quad (4)$$

Figure 2C:
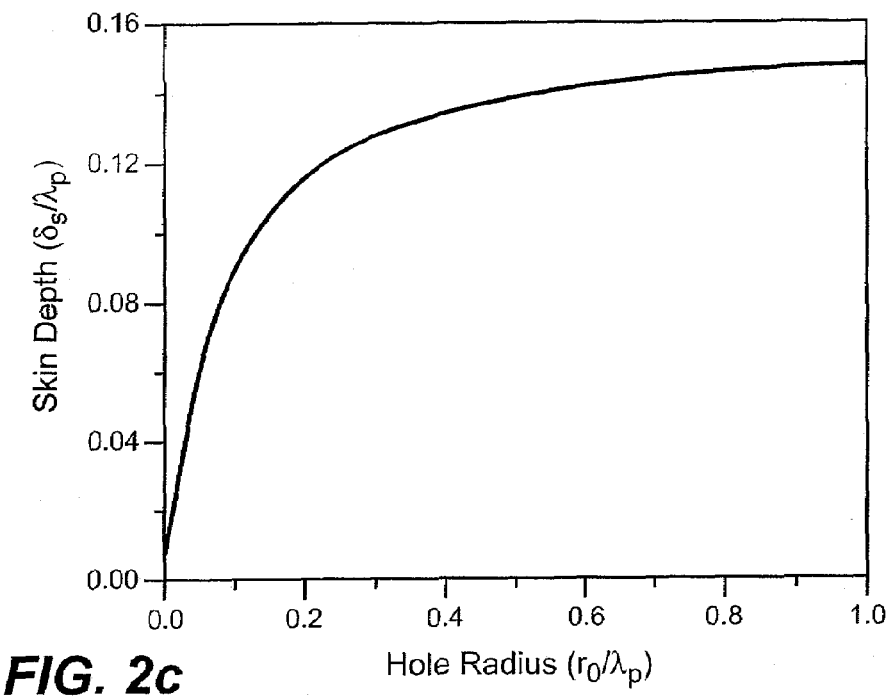
FIGS. 2(c) and 2(d) illustrate the Skin depth $\delta_s$ at the cutoff frequency for the plasmonic $HE_{11}$ mode as a function of hole radius $r_0$.
Figure 2D:
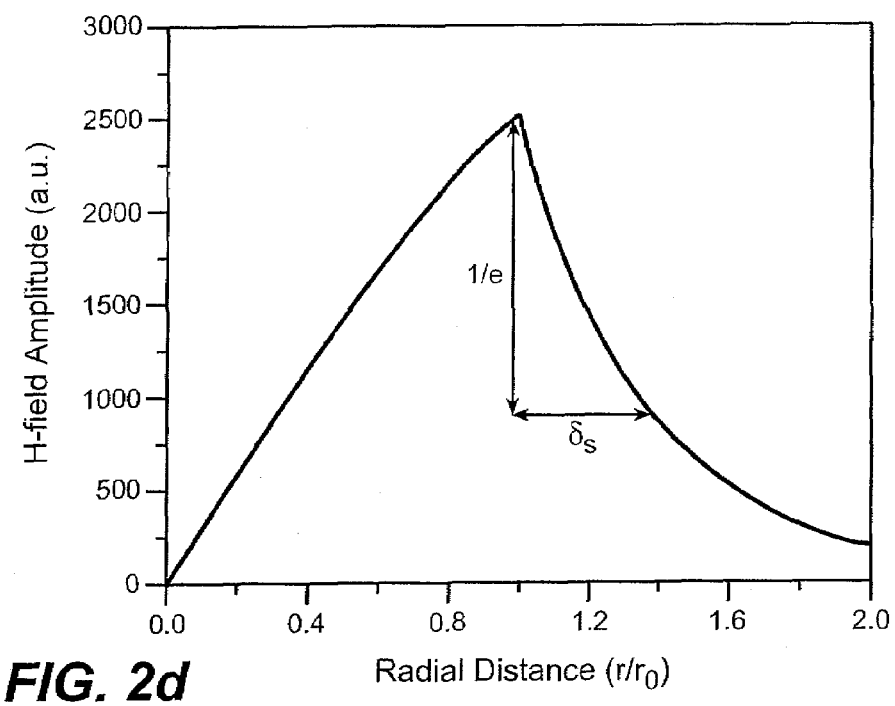

Alternatively, one could define skin depth, using the full magnetic field amplitude. Both definitions produce almost identical results. FIGS. 2c and 2d feature the normalized skin depth $\delta_s/\lambda_p$ as a function of the normalized hole radius $r_0/\lambda_p$. For "large" hole radius, the skin depth is approximately constant and using it as an offset might be appropriate. For "small" hole radius, the skin depth decreases rapidly and vanishes as the hole radius goes to zero. This behavior is confirmed by an asymptotic analysis of Eq. (4): When $k_T r_0$ approaches zero, $H_1^{(1)}(k_T r_0) \to \infty$. In order for the LHS to be finite and nonzero, $\delta_s$ needs to go to zero as well. Hence, in the "small" hole limit, the mode, in fact, does not penetrate into metal. In this regime, the plasmonic hole cannot be treated as a PEC hole with a larger effective radius. In contrast, our approach provides a consistent picture with small and large holes alike.

III. FDTD Simulation of Transmission

Based upon the modal dispersion analysis above, we now consider the transport properties of a single hole and a hole array. In both cases, we assume a metal film with finite thickness h. We use a 3D total-field/scattered-field FDTD implementation in which uni-axial phase-matched layer (UPML) absorbing boundaries truncate the simulation domain. For the single hole simulation, we apply a normally incident pulsed Gaussian-beam excitation centered at 500 nm to obtain the response in the ultra-violet and visible wavelength range within a single simulation. The Gaussian beam has a transverse spatial full-width half-maximum of 1 μm. The incidence plane is chosen a few 100 nm above the metallic film and the field data for determining the spectral transport properties of the waveguide, through direct integration of the Poynting vector, are collected in an observation plane placed in the middle of the metallic film. Such calculation measures the total amount of power that can pass through the hole. The transmittance is defined as the ratio of the power through the waveguide in the metallic film to the incident power.

Figure 3A:
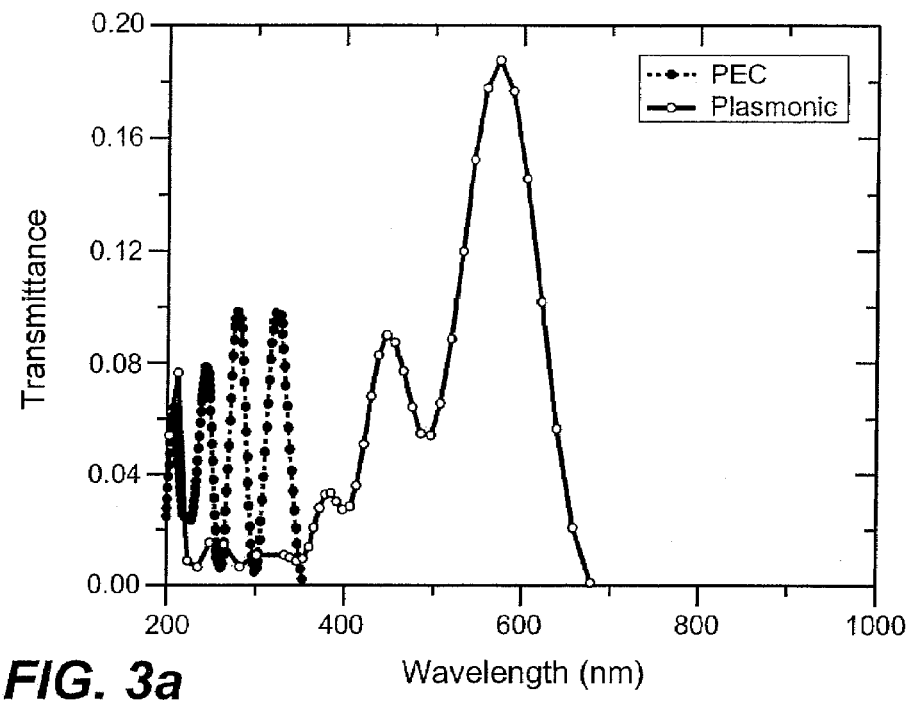
FIGS. 3(a) and 3(b) are graphical plots of the transmission spectrum of a single cylindrical hole. The solid line corresponds to the transmission spectrum of a single cylindrical hole ($r_0$=50 nm=0.36 $\lambda_p$) in a 250-nm thick metal film. The metal is modeled as a plasmonic material with $\lambda_p$=138 nm ($\omega^p$=1.37×10$^{16}$ rad/s) and $\omega_r$=7.29×10$^{13}$ rad/s. The hole is filled with a dielectric ($\in_h$=4). The dashed line is the transmission spectrum for the same geometry, except that the metal is modeled as a PEC.
Figure 3B:
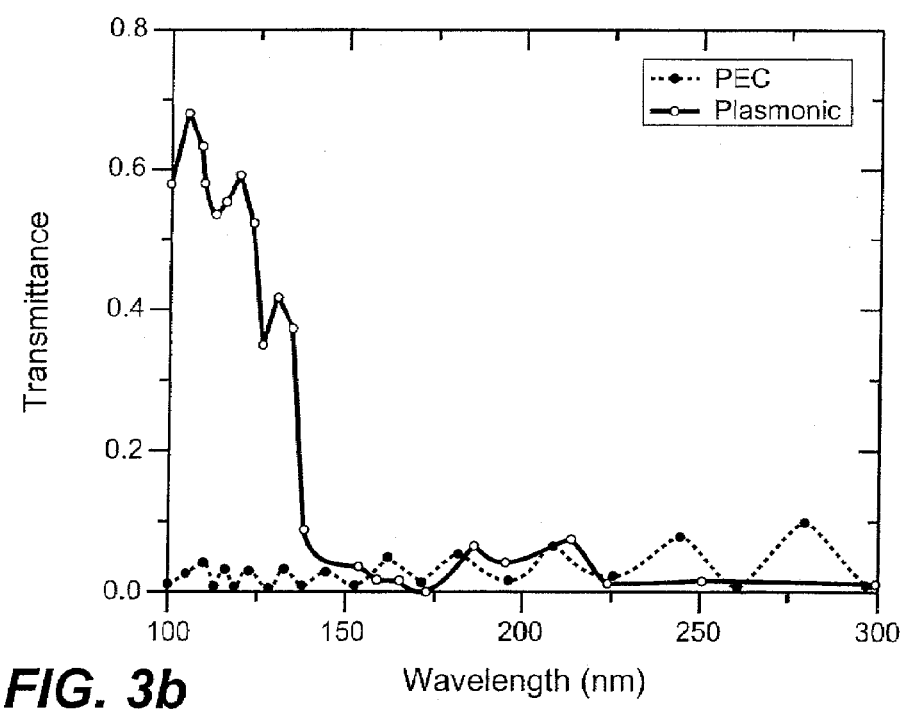

FIGS. 3(a) and 3(b) show the spectral transmittance of a cylindrical hole ($r_0$=50 nm=0.36$\lambda_p$) in a 250-nm thick metal film, modeled as a PEC (dashed line) and a plasmonic material (solid line), respectively. For the plasmonic material, we assume a plasma wavelength $\lambda_p$=138 nm ($\omega_p$=1.37×10$^{16}$ rad/s) and a collision frequency $\omega_\tau$=7.29×10$^{13}$ rad/s. This represents a commonly used model for silver and is approximately valid in the near-infrared with wavelengths down to 500 nm. In addition, we choose such that at least the lower cutoff wavelength is still within the region of validity. In any case, the goal here is to investigate the general behavior of the plasmonic material model. The presence of a non-zero collision frequency leads to losses and we can calculate the decay length $L_d$=1/2$k_\parallel''$, using the complex wave number of the mode $k_\parallel=k_{\parallel'}+ik_\parallel''$. The decay length is approximately 2-3 μm for most of the wavelength range covered by the $HE_{11}$ mode. Hence, the $HE_{11}$ mode can propagate over a distance that is relevant for transport through metallic films, which are a few hundred nanometers thick. (We note that the same conclusion holds when we repeat the calculation using tabulated data for the dielectric function of silver. E. D. Palik and G. Ghosh, Handbook of optical constants of solids (Academic Press, Orlando, 1985).

We fill the holes with a dielectric ($\epsilon_h$=4) while the film is surrounded by vacuum. In the PEC case, the spectral transmittance is approximately constant and then falls off at the cutoff wavelength $\lambda_c^{TE_{11}} \cong 3.41\sqrt{\epsilon_h}r_0$=341 nm, which is determined by the radius of the hole and the dielectric constant of the material inside the hole. In the plasmonic case, using the Drude free-electron model in Eq. (1) including losses, the transmittance depends on a combination of hole geometry, dielectric and metal properties. It features a region of high transmission (see FIG. 3(b)) below the bulk plasma wavelength ($\lambda_p$=138 nm). It is well known that in this region the bulk metal behaves as a dielectric and becomes transparent. Due to the $EH_{11}$ mode, the transparency region continues until $\lambda$=220 nm, in agreement with the dispersion diagram. Adjacent to this high transmission region is a region of zero transmission, which ranges from 220 to 350 nm. Past the stopband there is a pass-band with a cutoff at $\lambda_c^{HE_{11}}$=600 nm. This passband is due to the fundamental $HE_{11}$ mode. Both the stopband and the passband beyond it are unique transmission features resulting from the plasmonic dispersion diagram. In fact, the onset and cutoff of each of these features compares well with the values obtained from the dispersion calculation. In comparison with the PEC case, the $HE_{11}$ passband lies entirely beyond the PEC cutoff. The peak amplitude of the transmittance is larger than the peak amplitude in the PEC case. Its cutoff wavelength $\lambda_c^{HE_{11}}$ is almost twice as large as $\lambda_c^{TE_{11}}$ and features a decaying tail. We also emphasize the absence of a stopband in the PEC-based transmission spectrum. Simulations without loss component in the plasmonic model revealed that the transmission spectrum is quasi-independent of material losses (mean difference <10%). This is consistent with long decay lengths, which are on the order of microns for the plasmonic model, compared to the 250-nm thickness of the film. The importance of propagating modes on the transmission properties of subwavelength cylindrical holes is also evident for appropriately designed hole array structures. Previously, transmission enhancement for such structures has been largely associated with the resonant excitation of surface waves and evanescent tunneling through the holes. T. W. Ebbesen, H. J. Lezec, H. F. Ghaemi, T. Thio, and P. A. Wolff, Nature 391, 667 (1998); L. Martin-Moreno, F. J. Garcia-Vidal, H. J. Lezec, K. M. Pellerin, T. Thio, J. B. Pendry, and T. W. Ebbesen, Physical Review Letters 86, 1114 (2001); W. L. Barnes, A. Dereux, and T. W. Ebbesen, Nature 424, 824 (2003); A. Krishnan, T. Thio, T. J. Kima, H. J. Lezec, T. W. Ebbesen, P. A. Wolff, J. Pendry, L. Martin-Moreno, and F. J. Garcia-Vidal, Optics Communications 200, 1 (2001); J. B. Pendry, L. Martin-Moreno, and F. J. Garcia-Vidal, Science 305, 847 (2004); H. J. Lezec and T. Thio, Optics Express 12, 3629 (2004).

Figure 4:
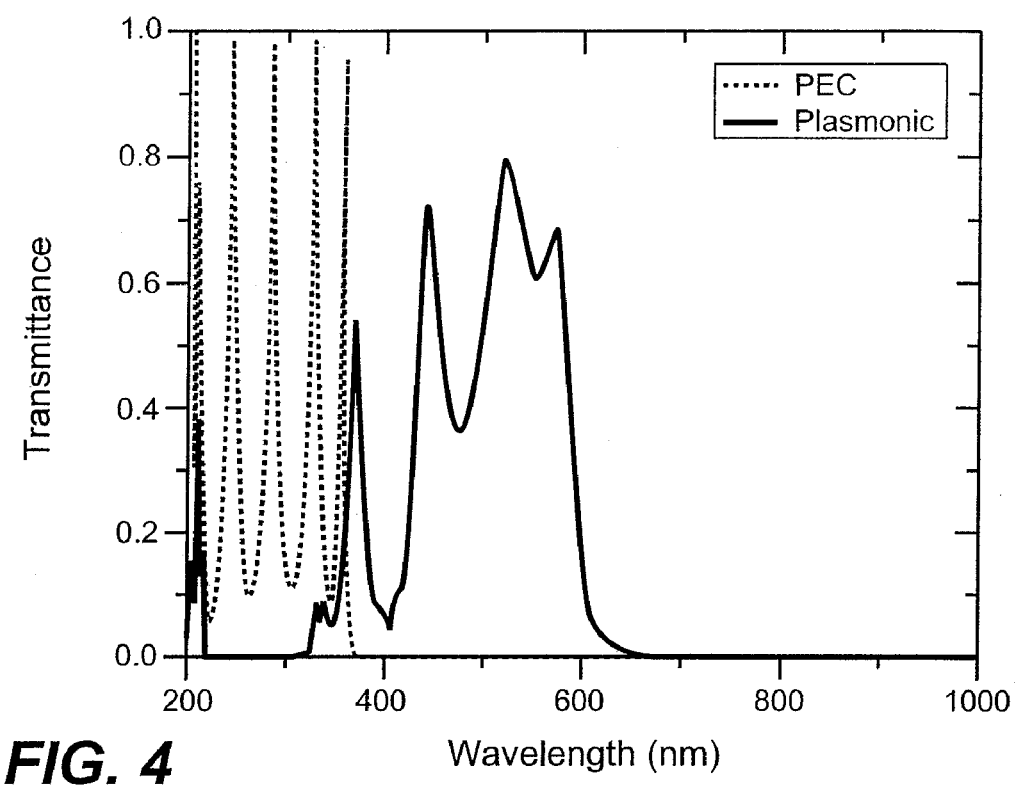
FIG. 4 is a graphical plot of the transmission spectrum of a 50-nm radius cylindrical hole array with 180-nm period (in x and y) in a 250-nm thick metal film. The solid line corresponds to the transmission spectrum T. The metal film and the dielectrics are modeled in accordance with the single hole case of FIGS. 3(a) and 3(b). The $E_x$ field profile along the hole exhibit two major peaks at wavelengths 442 nm (T=0.72) and 520 nm (T=0.79), respectively, with light incident from the top (The simulation domain used in 3D FDTD measures 180×180×1000 nm). The field pattern clearly shows the existence of propagating modes. The dashed line is the transmission spectrum for the same geometry, except the metal is modeled as a PEC.

Here, instead, we explore a different regime in which the propagating waveguide mode provides the dominant transport mechanism. For simplicity, we consider only plane waves incident along the normal direction. The signature of a propagating waveguide mode in the transmission will be most noticeable when the $HE_{11}$ band covers a wavelength range where no other competing mechanisms are present. Hence, the wavelengths of a surface wave resonance at normal incidence, due to the folding of the dispersion curve of the top and bottom surfaces, T. W. Ebbesen, H. J. Lezec, H. F. Ghaemi, T. Thio, and P. A. Wolff, Nature 391, 667 (1998), should be below the smallest wavelength of the $HE_{11}$ band, which corresponds to the surface plasmon wavelength inside the hole. For this to occur, the array needs to have a periodicity that is substantially smaller than what has been featured in recent experiments. FIG. 4 shows the transmittance spectrum T for an array of cylindrical holes, which has been designed according to aforementioned principles. It features an array of 50-nm radius cylindrical holes in a 250-nm thick metal film. The periodicity of the array is 180 nm and the holes are filled with a dielectric ($\in_h=4$), while the film is surrounded by vacuum. For the PEC model, this array has a transmission spectrum with a cutoff wavelength of 370 nm, which is close to the cutoff wavelength for a single dielectric-filled hole. Below that wavelength, the transmission band features a series of high-finesse Fabry-Perot resonances. In contrast, the spectrum of the plasmonic model (with same parameters as in the single hole case) shows a clear pass-band ranging from 350 to 600 nm that lies entirely beyond the PEC cutoff wavelength. This range, as well as the stop-band between 220 and 320 nm, once more agrees well with the dispersion relation of a single hole. The insets show the $E_x$ field profile along the aperture for the peaks at wavelengths 442 nm (T=0.72, left panel) and 520 nm (T=0.79, right panel). The field pattern clearly demonstrates the existence of propagating modes. Also, the transverse field profile inside the hole obtained from FDTD agrees well with the one obtained from the dispersion calculation in FIG. 1.

For the first time the importance of a plasmonic-based dispersion relation for the transport of incident light through subwavelength cylindrical holes in a metallic film has been shown. We find that the dispersion diagram exhibits three distinct features that have a profound impact on the transmission of incident light through cylindrical holes. First, such holes always support propagating modes near the surface plasmon frequency, regardless of how small the holes are. Second, the fundamental $HE_{11}$ mode, which couples to an external normally incident plane wave, is located completely below the surface plasmon frequency of the metal. Thus, a cylindrical hole in a plasmonic metal always exhibits a pass-band below the surface plasmon frequency. Third, when the radius of the hole is small, there exists a stopband, just above the surface plasmon frequency, where light does not transmit. Hence, a single hole may behave as a bandpass filter and allow longer wavelengths to pass through while rejecting shorter ones. All of these features are fundamentally different from the dispersion behavior assuming a PEC model and lead to qualitatively different transmission properties. Our results show the potential of using propagating modes to obtain high transmission with subwavelength holes. In FIG. 4, the plasmonic pass-band features a peak transmission of 0.79, which is approximately an order of magnitude higher when compared with previously published transmission in hole arrays. The use of small periodicity (approximately 200 nm) means that for all wavelengths of practical interest the array is diffraction-free while allowing for a bigger packing density of holes and potentially a smaller footprint. These benefits are likely to be important for practical applications.

Figure 6:
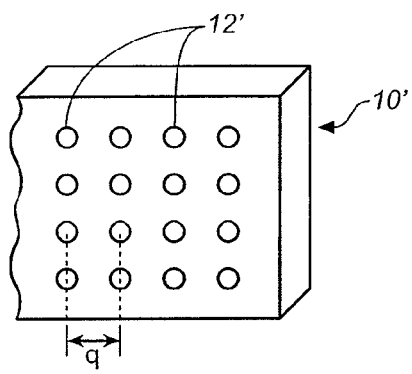
FIG. 6 is a perspective and partly cut away view of an electrically conductive layer 10 with a plurality of cylindrical holes each with radius $r_0$ to illustrate one embodiment of the invention.

FIG. 5 is a top view of an electrically conductive layer 10 with a cylindrical hole with radius $r_0$ to illustrate one embodiment of the invention. The material in layer 10 is opaque to the light it is interacting with. The hole is filled with a dielectric material different from air, with dielectric constant $\in_h$. Preferably the dielectric constant $\in_h$ of the dielectric material is in a range of about 1 to 20. The various light propagating properties of such device are explained above. Holes with other shapes may also be used. In general, where the cross-sectional dimension (diameter for a cylindrical hole) is less than $\lambda/2n_h$, where $\lambda$ is the wavelength of the light interacting with the layer, $n_h$ the diffractive index of the dielectric material, when the layer is illuminated by the light, a propagating mode of the light is present in the hole so that the layer transmits the light through the hole. This is true also where the layer has more than one hole therein as illustrated in FIG. 6. The light passing through the hole or holes will have a region of transmission at $(\sqrt{1+\in_h}\lambda_p)$, where $\lambda_p$ is plasma wavelength of the electrically conductive material in the layer. Preferably the cross-sectional dimensions of the hole or holes in layer 10 or 10' are in the range of about 10 to 200 nm.

Where the layer 10' has more than one hole therein as illustrated in FIG. 6, the holes do not need to be periodic, in order for the to transmit light in the manner described above, as shown by the above simulations of the plasmonic model. Where the holes 12' do form a periodic array, as shown in FIG. 6, in order to reduce surface plasmons, it is preferable for the periodicity q of the array of holes 12' to be less than about $\lambda_p(1+\in_h)^{1/2}$/factor, where the factor is larger than 1. More preferably, the factor has a value in a range from 1 or about 1 to about 10. Also it is preferred that the adjacent holes are not in contact with one another. Also preferably, the light interacting with the layer has at least one wavelength in a ultraviolet, visible or near-infrared range, such as 100-400 nm, 400-700 nm and 700-2000 nm. Preferably, the size of the hole or holes is selected so that the spectrum of the light passed by layer 10' or 10' spans over 200 nm.

To make a device that transmits light of wavelength $\lambda$ through one or more holes in a layer, such as the layer 10 and 10' of FIGS. 5 and 6, the plasma wavelength $\lambda_p$ of the electrically conductive material in the layer and dielectric constant $\in_h$ of the dielectric material in the hole or holes are selected so that $\lambda$ is about equal to $\lambda_p(1+\in_h)^{1/2}$. The size of the hole or holes may then be chosen so that the light transmitted through the at least one hole has a predetermined wavelength bandwidth based on the value of for the hole radius $r_0$.

Figure 7:
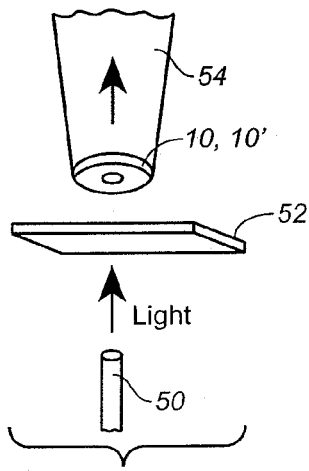
FIGS. 7 and 8 illustrate a near-field scanning optical microscope probe for use in detecting a sample in collection and emission modes respectively.
Figure 8:
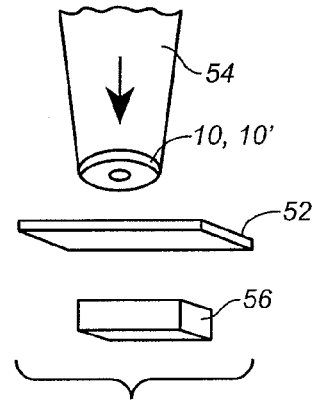

FIGS. 7 and 8 illustrate the operation of near-field scanning optical microscope probe for use in detecting a sample in collection and emission modes respectively using light of at least one wavelength $\lambda$ from a light source. As shown in FIG. 7, light from a light source 50 is supplied through a sample 52 to a layer with one or more holes therein, (only one hole is shown in FIG. 7). The light will pass through the hole or holes to the probe body 54 of the near-field scanning optical microscope. In FIG. 8, the light propagates from a light source (not shown) through the probe body 54, through hole or holes in layer 10 or 10' to detector 56.

Figure 9:
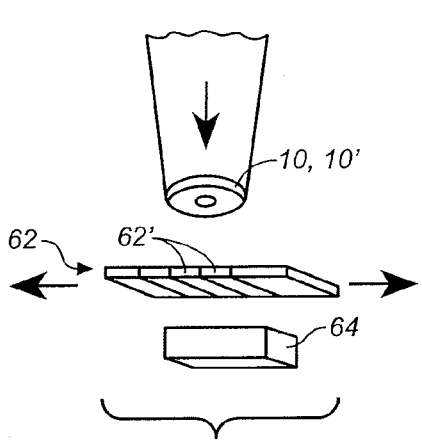
FIG. 9 illustrates an optical apparatus for writing data onto an optical storage device.

FIG. 9 illustrates the operation of an optical apparatus for writing data onto an optical storage device 62 using light of at least one wavelength $\lambda$ from a light source (not shown), said device having a surface with a plurality of light sensitive areas 62' (shown in dotted lines) thereon. Light from the source is transmitted from the probe body 54 through the one or more holes in layer 10 or 10' to device 62. As relative motion is cased by instrument 64 between device 62 and probe 54, data is written to the areas 62' of the device.

Figure 10:
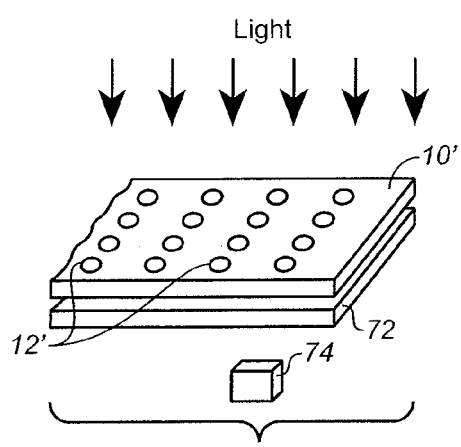
FIG. 10 illustrates an optical filtering apparatus.

Layer 10' can also be used as photolithography mask for transferring an image to a photoresist-coated substrate using light of at least one wavelength λ from a light source (not shown). A schematic view of this feature is illustrated in FIG. 10. The holes form a pattern corresponding to the image to be transferred to photoresist-coated substrate 72.

Layers 10 and 10' of FIG. 10 can also act as filters to transmit light of at least one wavelength λ within the pass band and blocks light outside the pass band where the propagating mode is absent in the hole or holes. The dielectric material in the hole or holes may comprise an electro-optic material, and said filter may further comprise an instrument 74 applying a voltage or electromagnetic field (not shown) to the dielectric material to tune the frequencies within the pass band.

Figure 11A:
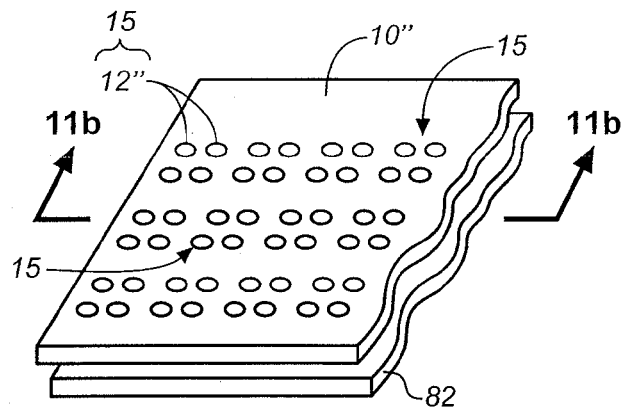
FIGS. 11(*a*) and 11(*b*) illustrate an apparatus for multi-spectral imaging of a sample.
Figure 11B:
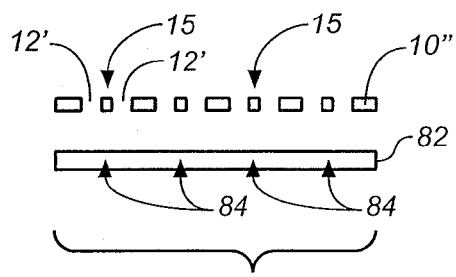

Illustrated in FIGS. 11(*a*) and 11(*b*) is an apparatus for multispectral imaging of a sample by means of light of at least a number of wavelengths $\lambda_i$, i ranging from 1 to m, m being a positive integer. FIG. 11(*b*) is a cross-sectional view of the apparatus in FIG. 11(*a*) along the line 11*b*-11*b* in FIG. 11(*a*). Layer 10" in FIGS. 11(*a*) and 11(*b*) is substantially the same as layer 10', except the holes 12" in layer 10" are arranged in a plurality of arrays 15, each array comprising 4 holes. A photodetector 82 has a surface 82' with a plurality of light sensitive pixels 84 (shown in dotted lines in FIG. 11(*b*)) thereon, wherein each array 15 of holes is adjacent to a corresponding pixel of the photodetector so that light originating from the sample and passing through such array reaches its corresponding pixel, causing the photodetector to collect at such pixel a signal representative of the power in the sample at one of the wavelengths $\lambda_i$. This apparatus may simply use ambient light, which is broad band light and includes a continuous spectrum of wavelengths. The pixels of the photodetector can, however, collect at such pixels only light of certain of the wavelengths, namely at $\lambda_i$.

Figure 12:
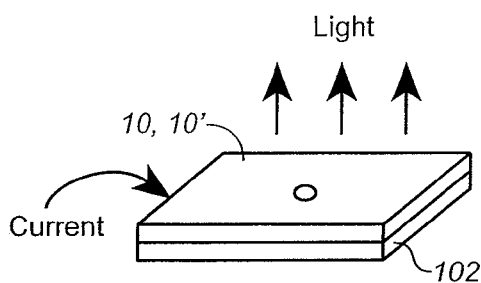
FIG. 12 illustrates a light emitter that generates light in response to electrical current, and of a light modulator in response to electrical current.

FIG. 12 illustrates the operation of a light emitter of light of at least one wavelength λ, comprising a device 102 that emits the light in response to electrical signals. Layer 10 or 10' is in electrical contact with device 102 so that when the electrical signals are applied to the layer, the signals are transmitted to the device 102 as well, causing the device to emit the light that passes through the hole or holes in the layer. Device 102 may comprise a LED, LCD or laser device. Alternatively, instead of being a device that emits the light in response to electrical signals, device 102 may modulate the light passing through it or reflected by it in response to electrical signals applied to it. The device 102, for example, may modulate the phase, polarization or amplitude of the light. In such event, when the electrical signals are applied to the layer 10 or 10', the signals are transmitted to the device 102, causing the device to modulate the light that passes through the hole or holes in the layer. Device 102 in such event may comprise a LCD, spatial light modulator, or liquid crystal polarizer.

Figure 13:
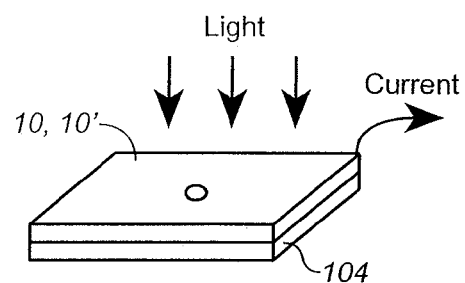
FIG. 13 illustrates a light collector that generates electrical current in response to light.

FIG. 13 illustrates the operation of a light collector that generates electrical current in response to light. In such event, when layer 10 or 10' is illuminated by the light, a propagating mode of the light is present in the hole or holes so that when the light is applied to the layer, the light reaches the device 104 through the hole or holes in the layer, causing the device 104 to generate the electrical current. Device 104 may comprise a solar cell, photodiode, or photovoltaic cell.

While the invention has been described above by reference to various embodiments, it will be understood that changes and modifications may be made without departing from the scope of the invention, which is to be defined only by the appended claims and their equivalents. For example, while some of the embodiments above are illustrated in the case of subwavelength cylindrical holes in electrically conductive films or layers, it will be understood that holes of other shapes (e.g. oval or elliptical, square, rectangular, polygonal and others) may be used and are within the scope of this invention.

It is claimed:

1. A body interacting with light of at least one wavelength λ, comprising:
   a layer of electrically conductive material having at least one hole therein, said material being opaque to the light; and
   a dielectric material in the at least one hole having refractive index $n_h$, said dielectric material being different from air, wherein a cross-sectional dimension of the at least one hole is less than about $\lambda/2n_h$, wherein when said body is illuminated by the light, a propagating mode of the light is present in the at least one hole so that the body transmits the light.

2. The body of claim 1, wherein said dielectric material has a dielectric constant within a range of about 1-20.

3. The body of claim 1, wherein said layer has a plurality of holes therein, said holes being at locations that do not form a periodic array.

4. The body of claim 3, wherein said dielectric material has a dielectric constant $\in_h$, and the light passing through the at least one hole has a region of transmission at about $\lambda_p(1+\in_h)^{1/2}$, where $\lambda_p$ is plasma wavelength of the electrically conductive material.

5. The body of claim 1, wherein said layer has a periodic array of holes therein, said array having a periodicity less than about $\lambda_p(1+\in_h)^{1/2}$/factor, where said factor is larger than 1.

6. The body of claim 5, where said factor has a value in a range from 1 to about 10.

7. The body of claim 1, wherein said layer has a periodic array of holes therein, said array having a periodicity so that adjacent holes are not in contact with one another.

8. The body of claim 1, wherein said light has at least one wavelength in a ultra-violet, visible or near-infrared range.

9. The body of claim 1, wherein said cross-sectional dimensions of the at least one hole are in a range of about 10 to 200 nm.

10. The body of claim 1, wherein said body transmits light within a wavelength range that spans over 200 nm.

11. The body of claim 1, wherein said electrically conductive material comprises a metallic material.

12. A method for making an optical device that transmits light of at least one wavelength λ: wherein the method comprises:
   providing a layer of electrically conductive material having at least one hole therein, said material being opaque to the light, said electrically conductive material having plasma wavelength $\lambda_p$; and
   causing a dielectric material to be present in the at least one hole, said dielectric material having a dielectric constant $\in_h$, said electrically conductive and dielectric materials chosen so that λ is about equal to $\lambda_p(1+\in_h)^{1/2}$, wherein a cross-sectional dimension of the at least one hole is less than about $\lambda/2n_h$, wherein $n_h$ is a refractive index of said dielectric material.

13. The method of claim 12, wherein said providing includes choosing a size for the at least one hole so that the light transmitted through the at least one hole has a predetermined wavelength bandwidth.

14. A near-field scanning optical microscope probe for use in detecting a sample in collection mode using light of at least one wavelength λ from a light source, comprising:

a layer of electrically conductive material having one hole therein, said material being opaque to the light; and a dielectric material in the one hole having refractive index $n_h$, said material being different from air, wherein a cross-sectional dimension of the hole is less than about $\lambda/2n_h$, wherein when said layer is illuminated by the light, a propagating mode of the light is present in the hole so that the layer transmits the light; and an optical conduit that transmits the light to said layer through said sample.

15. A near-field scanning optical microscope probe for use in detecting a sample in emission mode using light of at least one wavelength $\lambda$ from a light source, comprising:

a layer of electrically conductive material having one hole therein, said material being opaque to the light; and a dielectric material in the one hole having refractive index $n_h$, said material being different from air, wherein a cross-sectional dimension of the hole is less than about $\lambda/2n_h$, wherein when said layer is illuminated by the light, a propagating mode of the light is present in the hole so that the layer transmits the light;

an optical conduit that transmits the light to said layer through said sample; and a photodetector detecting light passing through said hole, through the sample to the photodetector.

16. An optical apparatus for writing data to an optical storage device using light of at least one wavelength $\lambda$ from a light source, said device having a surface with a plurality of light sensitive areas thereon, comprising:

a layer of electrically conductive material having one hole therein placed adjacent to said device, said material being opaque to the light; and a dielectric material in the hole having refractive index $n_h$, said material being different from air, wherein a cross-sectional dimension of the hole is less than about $\lambda/2n_h$, wherein when said layer is illuminated by the light, a propagating mode of the light is present in the hole so that the layer transmits the light from the light source to each of a plurality of selected pixels of the device;

an instrument causing relative motion between the device and the layer.

17. A wavelength-selective optical filter having a pass band that includes light of at least one wavelength $\lambda$, comprising:

a layer of electrically conductive material having a plurality of holes therein, said material being opaque to the light; and a dielectric material in the holes having refractive index $n_h$, said material being different from air, wherein cross-sectional dimensions of the holes are less than about $\lambda/2n_h$, wherein when said layer is illuminated by the light, a propagating mode of the light is present in the holes so that the layer transmits the light of wavelength $\lambda$ and blocks light outside the pass band where the propagating mode is absent in the holes.

18. The filter of claim 17, said dielectric material comprising an electrooptic material, said filter further comprising an instrument applying a voltage or electromagnetic field to the dielectric material to tune the frequencies within the pass band.

19. An apparatus for multispectral imaging of a sample by means of light of at least a number of wavelengths $\lambda i$, i ranging from 1 to n, n being a positive integer, said apparatus comprising:

a layer of electrically conductive material having a plurality of arrays of holes therein, said material being opaque to the light of wavelengths $\lambda i$; and a dielectric material in the holes having refractive index $n_h$, said material being different from air, wherein cross-sectional dimensions of the holes are less than about $\lambda i/2n_h$, wherein when said layer is illuminated by the light, a propagating mode of the light is present in the holes so that the layer transmits the light of wavelength $\lambda i$;

a photodetector having a surface with a plurality of light sensitive pixels thereon, wherein each array of holes is adjacent to a corresponding pixel of the photodetector so that light originating from the sample and passing through such array reaches its corresponding pixel, causing the photodetector to collect at such pixel a signal representative of the power in the sample at one of the wavelengths $\lambda i$.

20. A photolithography mask for transferring an image to a photoresist-coated substrate using light of at least one wavelength $\lambda$ from a light source, comprising:

a layer of electrically conductive material having a plurality of holes therein, said material being opaque to the light, said holes forming a pattern corresponding to the image to be transferred; and a dielectric material in the holes having refractive index $n_h$, said material being different from air, wherein cross-sectional dimensions of the holes are less than about $\lambda/2n_h$, wherein when said layer is illuminated by the light, a propagating mode of the light is present in the holes so that the layer transmits the light to the photoresist-coated substrate according to the pattern of holes in the layer.

21. A light emitter of light of at least one wavelength $\lambda$, comprising:

a device that emits the light in response to electrical signals;

a layer of electrically conductive material having a plurality of holes therein, said material being opaque to the light, said layer being in electrical contact with said device; and a dielectric material in the holes having refractive index $n_h$, said material being different from air, wherein cross-sectional dimensions of the holes are less than about $\lambda/2n_h$, wherein when said layer is illuminated by the light, a propagating mode of the light is present in the holes so that when the electrical signals are applied to the layer, the signals are transmitted to the device, causing the device to emit the light that passes through the holes in the layer.

22. The emitter of claim 21, said device comprising a LED, LCD or laser.

23. A light collector of light of at least one wavelength $\lambda$, comprising:

a device that generates electrical current in response to the light;

a layer of electrically conductive material having a plurality of holes therein, said material being opaque to the light, said layer being in electrical contact with said device; and a dielectric material in the holes having refractive index $n_h$, said material being different from air, wherein cross-sectional dimensions of the holes are less than about $\lambda/2n_h$, wherein when said layer is illuminated by the light, a propagating mode of the light is present in the holes so that when the light is applied to the layer, the light reaches the device through the holes in the layer, causing the device to generate the electrical current.

24. The collector of claim 23, said device comprising a solar cell, photodiode, or photovoltaic cell.

25. An apparatus that modulates light of at least one wavelength $\lambda$, comprising:
- a device that modulates the light in response to electrical signals;
- a layer of electrically conductive material having a plurality of holes therein, said material being opaque to the light, said layer being in electrical contact with said device; and
- a dielectric material in the holes having refractive index $n_h$, said material being different from air, wherein cross-sectional dimensions of the holes are less than about $\lambda/2n_h$, wherein when said layer is illuminated by the light, a propagating mode of the light is present in the holes so that when the electrical signals are applied to the layer, the signals are transmitted to the device, causing the device to modulate the light that passes through the holes in the layer.

26. The apparatus of claim 25, wherein said device modulates the phase, polarization or amplitude of the light.

27. The collector of claim 25, said device comprising a LCD, spatial light modulator, or liquid crystal polarizer.

* * * * *